United States Patent

[11] 3,561,748

| [72] | Inventor | Corby J. Schefers<br>1112 B Chestnut St., Burbank, Calif. 91502 |
|---|---|---|
| [21] | Appl. No. | 768,782 |
| [22] | Filed | Oct. 18, 1968 |
| [45] | Patented | Feb. 9, 1971 |

[54] WORKPIECE CLAMP
9 Claims, 6 Drawing Figs.

[52] U.S. Cl. .................................................. 269/8, 269/265
[51] Int. Cl. .................................................. B25b 11/00
[50] Field of Search .................................................. 269/8, 265,

[56] References Cited
UNITED STATES PATENTS
2,477,297   7/1949   Giles .............................. 269/8

*Primary Examiner* — Andrew R. Juhasz
*Assistant Examiner* — Donald D. Evenson
*Attorney* — Sellers and Brace ABSTRACT: A versatile workpiece clamp having many uses with and without magnetic chucks. The clamp comprises a strip of rigid material having closely-spaced slightly-flexible fingers acutely inclined to one lateral edge with their exposed ends lying in a common plane and adapted to be held in firm contact with a workpiece backed by a suitable stop. A work force applied to the exposed surface of the workpiece and generally toward the fingers acts to flex the fingers into firmer gripping contact with the workpiece without risk of injury thereto. The clamp can be used alone or in combination with a second clamp. If made of magnetic material the clamp can be used with a magnetic chuck and employed to clamp workpieces made of a wide variety of nonmagnetic materials.

PATENTED FEB 9 1971

3,561,748

INVENTOR.
CORBY J. SCHEFERS
BY
ATTORNEYS

WORKPIECE CLAMP

This invention relates to a clamp and more particularly to a one-piece clamp formed in one piece from a strip of rigid material and having the capability of firmly gripping a workpiece while undergoing a processing operation without risk of injury to the workpiece surface.

Many proposals have been made heretofore grips, clamps, vises, wedging devices, etc., employed to hold a workpiece firmly anchored to a bench or the bed of a machine tool while being worked upon. Despite the many proposals made to meet these needs all are subject to certain disadvantages and shortcomings sought to be obviated by the present invention. A particularly versatile and widely used clamping device is known as a magnetic chuck and utilizes a multiplicity of magnetic members underlying the workpiece and gripping it firmly and immovably so long as energized. However, this device, though highly satisfactory for many uses, has definite limitations as respects its use in holding nonmagnetic workpieces including those made of glass, ceramic, plastic, brass, aluminum and many other materials of a nonferrous character.

These and many other shortcomings of prior clamping devices are eliminated by the present invention utilizing a simple, inexpensive, rugged strip of material slotted to provide a multiplicity of similar slightly flexible fingers acutely inclined to one edge of the strip. The free ends of the fingers are preferably smooth surfaced and lie in a common plane normal to the opposite faces of the strip. These end surfaces are firmly pressed against the object to be gripped while that object is backed by a suitable stop, care being taken that the fingers extend generally opposite to the direction in which the working force is to be applied to the workpiece. The applied working force then tends to flex the fingers in a direction increasing the gripping pressure on the workpiece. Accordingly, an important principle of the invention is the fact that the effective gripping force increases automatically with the applied working force.

The clamping strip may be anchored to the supporting surface by another clamping member, or preferably by energizing of a magnetic chuck against which the strip rests. If the clamp is intended for use with a magnetic chuck then it is made of magnetic material; otherwise the clamping strip may be made of a wide range of both metallic and nonmetallic materials. Irrespective of the material from which it is made, the clamp may be used to clamp workpieces having highly finished surfaces without risk of defacing these surfaces or distorting the material thereof.

Accordingly, it is a primary object of this invention to provide a unique and versatile clamping tool and method for use in gripping one or more workpieces while undergoing processing.

Another object of the invention is the provision of a simple rugged strip of rigid material useful in a wide variety of manners to releasably grip a workpiece on a bench or a machine tool.

Another object of the invention is the provision of a simple, unitary clamping tool and method usable in combination with a magnetic chuck to grip a nonmagnetic workpiece.

Another object of the invention is the provision of an improved, highly effective method of clamping a workpiece while being worked upon.

These and other more specific objects will appear upon reading the following specification and claims and upon considering in connection therewith the attached drawing to which they relate.

Referring now to the drawing in which a preferred embodiment of the invention is illustrated.

Figure 1:
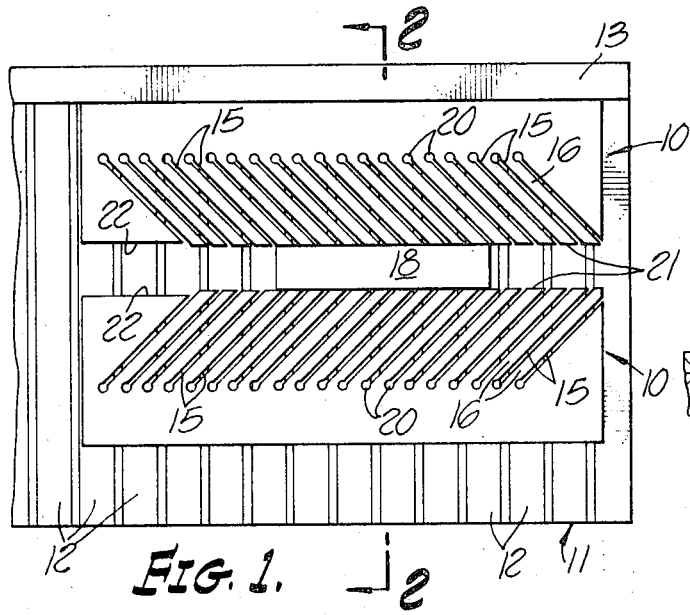
FIG. 1 is a fragmentary top plan view of a magnetic chuck supporting a pair of the invention clamps against either side of a nonmagnetic workpiece.
Figure 2:
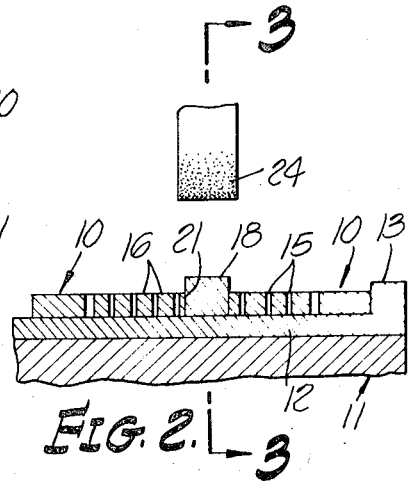
FIG. 2 is a fragmentary cross-sectional view taken along line 2–2 on FIG. 1.

Referring more particularly initially to FIGS. 1 and 2, there is shown a pair of identical clamps, designated generally 10, embodying the invention principles and made in accordance with one preferred embodiment thereof. Although the one-piece clamp may be formed of any suitable rigid material, if the clamp is to be used in combination with a magnetic chuck it should be made of a ferrous material, as soft iron or mild steel, in order that the clamp can be firmly anchored in a desired position so long as magnetic chuck 11 is energized. It will be understood that the chuck may be of any conventional construction having the tips of a multiplicity of pole pieces 12 lying in a common plane comprising the supporting surface of the chuck. Such chucks usually include as an integral part thereof a rigid stop or fence 13 of low height and against which the workpiece, a wedge, or other object bears when the chuck is in use. As is well known to those skilled in this art, chucking device 11 usually includes electrical means for energizing the chuck. Since these details are well known they need not be further illustrated nor described here.

In a typical embodiment, clamp 10 is formed of a long strip of suitable rigid material preferably rectangular in cross section. This strip is provided with a multiplicity of long narrow parallel slots 15 lying at an acute angle to one longitudinal edge of the strip. As here shown, slots 15 lie at an acute angle of approximately 45° to the edge of the strip and extend approximately two-thirds the way across the strip. The length of slots 15 is such as to provide long slender fingers 16 having limited flexibility and sufficiently strong as to apply powerful gripping force to the adjacent surface of workpiece 18. As herein shown by way of illustration, fingers 16 are approximately square in cross section and their inner or root ends are preferably relieved by an enlargement or bores 20 having a size to provide the fingers with the requisite stiffness and flexibility for a particular application. In this connection it is pointed out that the relief provided by bores 20 permits the fingers to flex about their root ends while the finger proper remains substantially rigid and inflexible.

The end face 21 of each finger is preferably smooth and lies in a plane common with the end faces of all other fingers. In consequence, the gripping and clamping power of the clamp is dependent to a high degree on the frictional pressure acting between the end faces of the fingers and the adjacent surfaces of the workpiece in contact therewith. There is, of course, a tendency for the fingers to pivot about their inner root ends but since the finger ends are initially in firm contact with the workpiece, only minuscule pivotal movement is possible. In consequence, there is no tendency for the marginal edge of the finger ends to bite into the workpiece to deform or deface its surface. Accordingly, workpieces of relatively soft material, such as polished and smooth-surfaced glass, plastics or the like, can be clamped without defacing the surface engaged by the invention clamping fingers.

It will be noted that the small, generally triangular section at the left hand of the clamps shown in the drawing is relieved along its edge 22 for a slight depth adequate to insure that this surface does not engage the workpiece at any time and, like the similar but smaller triangular section at the opposite end, serves to protect the adjacent fingers from injury. As shown, edge portion 22 has been relieved by as much as 15 to 20 mils.

The several figures of the drawing show the invention clamp being used for different purposes. In each of these figures, the clamp is made of magnetic material and therefore can be rigidly anchored to the pole faces of chucking device 11 by energizing this chuck while clamp 10 is held firmly pressed against one lateral edge of workpiece 18. In FIG. 1, the workpiece is clamped between the fingers of two of the clamping devices one of which bears against the backup strip 13 of the magnetic clutch. However, when using a pair of the clamps with a magnetic chuck, it is not necessary that either clamp bear against a fixed backup stop for self evident reasons.

Figure 5:
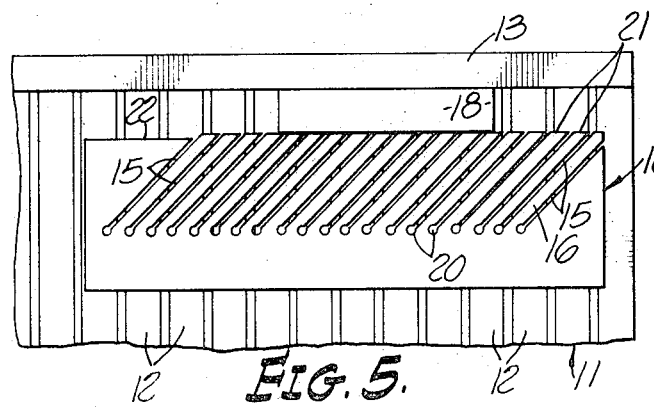
FIG. 5 is a view similar to FIG. 1 but showing a single clamp in use to clamp a workpiece against the fixed stop of a magnetic chuck.

In FIG. 5, workpiece 18 is held locked in a desired processing position on the magnetic chuck by a single clamp 10. In this case, the workpiece is held pressed against the fixed stop 13 by the clamp at the time the chuck is energized. The height of backup 13 should be less than the thickness of the workpiece so as not to interfere with the processing operation to be performed on the exposed upper face of the workpiece.

Figure 3:
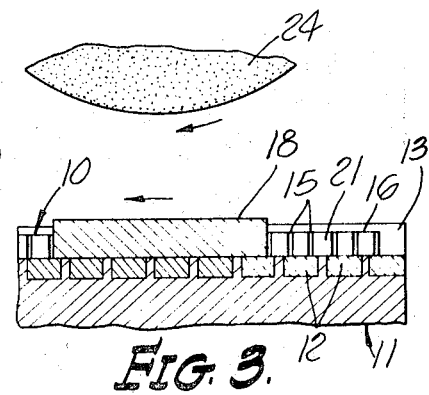
FIGS. 3 and 4 are views taken along line 3–3 on FIG. 2, FIG. 3 showing the workpiece positioned in readiness for a grinding operation, and FIG. 4 showing the workpiece in readiness for a planing operation.

In FIGS. 1 and 2, there is shown a polishing or grinding wheel 24 and this should rotate and be advanced over the surface of the workpiece in the directions indicated by the arrows in FIG. 3. It will therefore be evident that the forces imparted to the workpiece by the advance of the grinding wheel thereover tend to shift the piece to the left as viewed in FIGS. 3 and 5, or in a direction generally opposed to the direction of finger projections from their junction with the main body of clamp 10. It will be understood that a suitable support is provided for the wheel 24 as well as means for adjusting it vertically into and out of engagement with the top surface of the workpiece.

Figure 4:
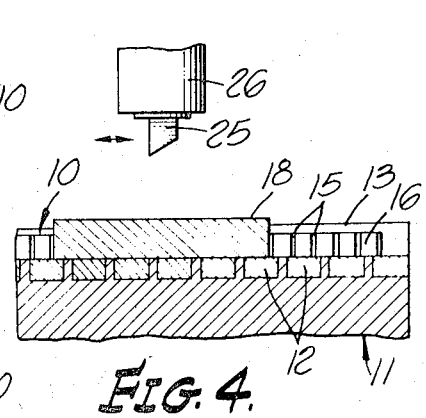

FIG. 4 differs from FIG. 3 essentially in showing a planing tool 25 mounted in a suitable support 26 and understood as reciprocal to and fro lengthwise of workpiece 18. It will also be understood that the support for the planing tool is adjustable vertically to control the depth of the cut.

Figure 6:
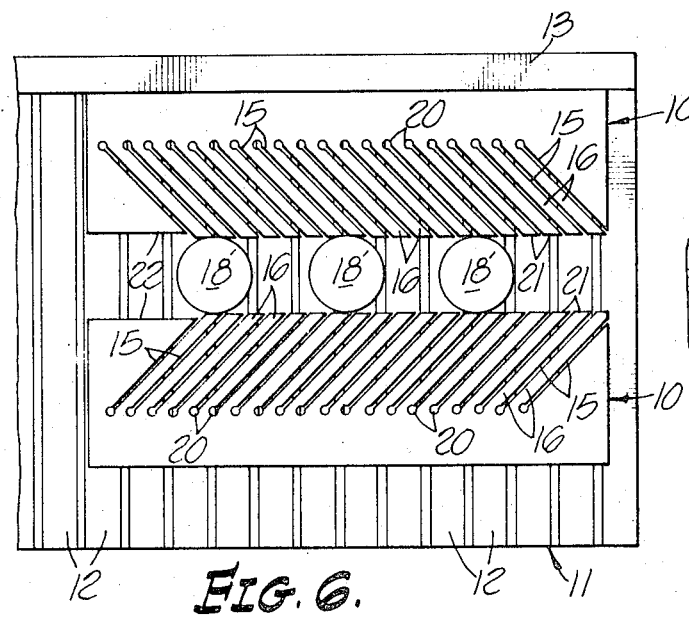
FIG. 6 is a view similar to FIG. 1 but showing a pair of the clamps in use to clamp a plurality of circular discs in preparation for a grinding and polishing operation.

FIG. 6 shows a plurality of identical discs of plastic, glass, ceramic or other nonmagnetic material, clamped between the flexible fingers of two clamps 10 in the same general manner described in detail in connection with FIG. 1. If more than two discs are to be clamped simultaneously, it is important that they be of uniform diameter. For best results, each disc is arranged adjacent to be in contact with the end faces of a pair of fingers of each clamp. However, one of the clamps may be omitted, in which case each disc is held against backup rail 13 of the chucking device by a single clamp 10.

If the invention clamp is used without a chucking device, then the workpiece is placed against the bed of a machine tool or other flat surface and the invention clamp 10 is used by itself in cooperation with a suitable backup secured to the work support or, alternatively, a pair of the clamps are used in combination. In this case, each clamp must be clamped to the work surface while held pressed firmly against the workpiece as by an ordinary C-clamp, a clamping vise, or any of many expedients well known to machinist. It suffices to press the free ends of the fingers of one or both clamps firmly against the workpiece while the clamping device for clamp 10 is being tightened. Thereafter the fingers operate in the same manner discussed above and flex to increase the clamping pressure as a work force is applied to the workpiece.

While the particular workpiece clamp and the like herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A workpiece clamp for use in holding a workpiece jammed against a fixed backup while work is being performed on the workpiece, said clamp comprising a single wide strip of homogeneous rigid material of rectangular cross section having a row of long fingers lying at an acute angle to one edge of said strip and integral with one another distantly from the free ends thereof, said clamp being flat and inflexible transversely of the thickness thereof the free ends of said fingers being flat and lying in a common plane normal to the wide face surfaces of said strip, the free ends of said slender fingers being frictionally engageable with a workpiece and deflected in the plane of the strip and in a direction to increase the clamping pressure against the workpiece as an attempt is made to shift the workpiece in one direction thereby to hold a workpiece supported against a backup and effective to anchor the workpiece against movement by a working force tending to increase the frictional engagement of the ends of the fingers with the workpiece.

2. A workpiece clamp as defined in claim 1 characterized in that said clamp strip is formed of magnetic material.

3. A workpiece clamp as defined in claim 1 characterized in that adjacent ones of said fingers are separated from one another by a narrow intervening slot each opening into an enlargement at its inner end effective to decrease the width of the fingers at their inner root ends to a width less than the width of the main body of said fingers thereby enabling the fingers to flex at the root ends thereof rather than along the length of said fingers.

4. A workpiece clamp adapted to be used with a magnetic chuck to hold a workpiece anchored while being worked upon, said clamp comprising a single elongated rigid planar strip of magnetic material inflexible transversely of its thickness and having long slots extending inwardly at an acute angle from one lateral edge thereof to provide a multiplicity of long relatively inflexible fingers rigidly interconnected along the other lateral edge of said strip, the free end edges of said fingers lying in a common plane normal to the face of said strip and effective to grip the adjacent surface of a workpiece with increasing frictional pressure as a working force is applied to a workpiece in a direction tending to flex said fingers solely in the plane of said clamp and in a direction to increase the width of said strip whereby an increasing work force automatically increases the clamping force applied to the workpiece.

5. An article of manufacture comprising a single elongated rigid planar strip of rectangular shape in cross section, said strip being inflexible transversely of its thickness and having a series of deep closely-spaced slots extending through one lateral edge of said strip to points adjacent the other lateral edge and lying at an acute angle to said one edge, said slots dividing said strip into a plurality of long relatively nonflexible fingers having their free end faces lying in a common plane generally normal to the face of said strip, thereby to provide a powerful clamping device adapted to be anchored immovably to a support for a workpiece with the free end faces of said fingers positioned to bear against a workpiece and being effective to hold a workpiece firmly when a working force is applied to the workpiece tending to flex said fingers in a direction opposite to the slope thereof and so as to increase the planar width of said clamping strip.

6. That method of utilizing a magnetic chucking device to clamp a nonmagnetic workpiece to the bed of a machine tool while work is being performed thereon which method comprises: placing the nonmagnetic workpiece against a fixed backup of a machine tool bed and adjacent a magnetic chucking device secured to the machine tool, positioning the free end faces of long relatively nonflexible fingers against the workpiece on the side thereof remote from said backup and the ends of which fingers are integrally attached to and form a part of a long planar strip of homogeneous rigid magnetic material slotted at an acute angle from one lateral edge thereof, energizing the chucking device to clamp the workpiece after noting that the face of said strip has been placed against the chucking device such that the free ends of said fingers project generally oppositely to the work force to be applied to the workpiece, and utilizing a working force applied to the workpiece in a direction to increase the frictional engagement of the finger ends of the fingers and to flex the fingers about their root ends in the plane of said planar strip and toward the fixed backup for the workpiece thereby to anchor the workpiece against movement.

7. That method of holding a smooth-surfaced nonmagnetic workpiece to the bed of a tool while being worked upon without risk of damage to the smooth surfaces subjected to clamping pressure which method comprises: placing one edge of the workpiece against fixed backup means, placing one flat face of a single planar multislotted clamping plate flush against a supporting surface for the workpiece with one lateral edge against an edge of the workpiece on the opposite side thereof from said fixed backup, and which clamping plate has a multiplicity of long relatively nonflexible fingers lying at acute angles to the plate edge, securing said clamping plate against movement, and activating said fingers to clamp the workpiece by applying the working force to the workpiece in a direction tending to flex said fingers in the plane of said clamping plate about their respective root ends in an arc toward said workpiece and the fixed backup therefor thereby to jam the workpiece more firmly between the free ends of said fingers and said backup.

8. That method defined in claim 7 characterized in the steps of utilizing magnetic material for said clamping plate, and energizing a magnetic chuck device to hold the free ends of the fingers of said clamping plate in frictional engagement with the edge of the workpiece remote from said fixed backup.

9. That method of chucking the finished edges of a workpiece without risk of damage thereto while performing work thereon which method comprises: resting the workpiece on a support surface, applying the flat-surfaced free ends of two sets of coplanar closely spaced long relatively nonflexible fingers against the opposed edges of said workpiece with the free ends of the fingers parallel to one another and the longitudinal axes of the fingers of said two sets lying in a common plane parallel to the support surface for the workpiece and converging toward one another, clamping the remote ends of said sets of fingers against movement and with their adjacent free ends in light pressure contact with the edges of a workpiece, and activating said fingers to clamp the workpiece by applying a work force to the workpiece in a direction to flex the free ends of said two sets of fingers about their respective root ends and into tighter pressure and frictional contact with the edges of the workpiece.